US010038650B2

(12) United States Patent
Yong et al.

(10) Patent No.: US 10,038,650 B2
(45) Date of Patent: Jul. 31, 2018

(54) SYSTEM AND METHOD FOR TUNNEL STITCHING TRANSPORT

(71) Applicant: Futurewei Technologies, Inc., Plano, TX (US)

(72) Inventors: Lucy Yong, Georgetown, TX (US); Weiguo Hao, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 42 days.

(21) Appl. No.: 15/247,027

(22) Filed: Aug. 25, 2016

(65) Prior Publication Data
US 2017/0063783 A1 Mar. 2, 2017

Related U.S. Application Data

(60) Provisional application No. 62/209,722, filed on Aug. 25, 2015.

(51) Int. Cl.
*H04L 12/935* (2013.01)
*H04L 29/06* (2006.01)
*H04L 29/08* (2006.01)
*H04L 12/715* (2013.01)
*H04L 12/46* (2006.01)

(52) U.S. Cl.
CPC ...... *H04L 49/3045* (2013.01); *H04L 12/4633* (2013.01); *H04L 45/64* (2013.01); *H04L 67/10* (2013.01); *H04L 67/2814* (2013.01); *H04L 69/22* (2013.01)

(58) Field of Classification Search
None
See application file for complete search history.

(56) References Cited

U.S. PATENT DOCUMENTS

2006/0171365 A1* 8/2006 Borella ............... H04L 12/4633
370/338
2013/0031271 A1* 1/2013 Bosch .................. H04W 40/36
709/245
2015/0029849 A1* 1/2015 Frost ..................... H04L 47/125
370/235

(Continued)

OTHER PUBLICATIONS

Herbert, T., et al, "Generic UDP Encapsulation draft-ietf-nvo3-gue-03," Network Virtualization Overlays (nvo3), Standard Track, Jun. 10, 2016, 28 pages.

(Continued)

*Primary Examiner* — Diane Lo
(74) *Attorney, Agent, or Firm* — Conley Rose, P.C.

(57) ABSTRACT

A first network element (NE) implemented as a network virtualization edge (NVE) includes a receiver configured to receive a packet comprising a destination address, a processor coupled to the receiver and configured to obtain a tunnel identifier of an overlay tunnel that communicatively couples a second NE to a third NE on an overlay path toward the destination address, add the tunnel identifier to an encapsulation header of the packet, and add an address of the second NE to an outer header of the packet, and a transmitter coupled to the processor and configured to transmit the packet to the second NE, wherein the packet is forwarded from the second NE to the third NE via the overlay tunnel identified by the tunnel identifier.

20 Claims, 11 Drawing Sheets

(56) References Cited

U.S. PATENT DOCUMENTS

| | | | | |
|---|---|---|---|---|
| 2015/0188773 A1* | 7/2015 | DeCusatis | ........... | G06F 9/45558 370/254 |
| 2015/0281128 A1* | 10/2015 | Sindhu | ................... | H04L 49/10 370/355 |
| 2016/0020941 A1* | 1/2016 | Asati | ................... | H04L 41/0659 370/228 |
| 2016/0359745 A1* | 12/2016 | Hao | ........................ | H04L 12/46 |
| 2017/0012870 A1* | 1/2017 | Blair | .................. | H04L 12/4633 |

OTHER PUBLICATIONS

Kreeger, L., Ed., et al, "Generic Protocol Extension for VXLAN draft-ietf-nvo3-vxlan-gpe-02.txt," Network Working Group, Standards Track, Apr. 21, 2016, 23 pages.

Yong, L., Ed., et al, "GRE-in-UDP Encapsulation draft-ietf-tsvwg-gre-in-udp-encap-13," Network Working Group, Standard Track, Jul. 4, 2016, 24 pages.

Kumar, S., Ed., et al, "UDP Transport for Network Service Header draft-kumar-sfc-nsh-udp-transport-02," Service Function Chaining, Standards Track, Feb. 11, 2016, 16 pags.

Black, D., et al, "An Architecture for Overlay Networks (NVO3) draft-narten-nvo3-arch-00," Internet Engineering Task Force, Jul. 8, 2013, 24 pages.

Rosen, E., Ed., et al, "Using the BGP Tunnel Encapsulation Attribute without the BGP Encapsulation SAFI draft-rosen-idr-tunnel-encaps-03," IDR Working Group, Standards Track, Aug. 6, 2015, 29 pages.

Yong, L., et al, "Tunnel Stitching for Network Virtualization Overlay draft-yong-nvo3-tunnel-stitching-00," Network Working Group, Standard Track, Jul. 8, 2016, 7 pages.

Amante, S., et al, "IPv6 Flow Label Specification," Internet Engineering Task Force (IETF), RFC 6437, Standards Track, Nov. 2011, 15 pages.

Kompella, K., et al, "The Use of Entropy Labels in MPLS Forwarding," Internet Engineering Task Force (IETF), RFC 6790, Standards Track, Nov. 2012, 25 pages.

Farinacci, D., et al, "The Locator/ID Separation Protocol (LISP)," Internet Engineering Task Force (IETF), RFC 6830, Jan. 2013, 25 pages.

Mahalingam, M., et al, "Virtual eXtensible Local Area Network (VXLAN): A Framework for Overlaying Virtualized Layer 2 Networks over Layer 3 Networks," RFC 7348, Aug. 2014, 22 pages.

Xu, X., et al, "Encapsulating MPLS in UDP," Internet Engineering Task Force (IETF), RFC 7510, Standards Track, Apr. 2015, 19 pages.

* cited by examiner

SYSTEM AND METHOD FOR TUNNEL STITCHING TRANSPORT

CROSS-REFERENCE TO RELATED APPLICATIONS

The present application claims priority to U.S. Provisional Patent Application 62/209,722, filed Aug. 25, 2015 by Lucy Yong and Weiguo Hao, and entitled "Tunnel Egress Assigned Flow Entropy," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer virtualization has dramatically and quickly changed the information technology (IT) industry in terms of efficiency, cost, and the speed in providing new applications and/or services. The trend continues to evolve towards network virtualization, where a set of virtual machines (VMs) or servers may communicate in a virtual network environment that is decoupled from the underlying physical networks in a data center (DC). An overlay virtual network is one approach to provide network virtualization services to a set of VMs or servers. An overlay virtual network may enable the construction of many virtual tenant networks on a common network infrastructure, where each virtual tenant network may have independent address space, independent network configurations, and traffic isolation among each other, which are all decoupled from the underlying network infrastructure. In addition, an overlay virtual network may support migrations of VMs since there is no longer a physical network limitation. Further, an overlay virtual network may speed up the configuration of multi-tenant cloud applications and virtual DCs, leading to potential new DC applications, such as a software defined DC.

An overlay virtual network may provide communication among a set of tenant systems (TSs), where TSs may be VMs on a server or physical servers. An overlay virtual network may provide Layer 2 (L2) or Layer 3 (L3) services to the connected TSs via network virtualization edges (NVEs), where NVEs may be implemented as part of a virtual switch within a hypervisor, and/or physical switch or router. An NVE encapsulates ingress tenant traffic and sends the encapsulated traffic over a tunnel across an underlying network toward an egress NVE. An egress NVE at the tunnel remote end point decapsulates the traffic prior to delivering the original data packet to the appropriate TS. There are a number of encapsulation protocols available in the industry today, such as virtual eXtensible Local Area Network (VXLAN) encapsulation, Microsoft's Network Virtualization over Generic Routing Encapsulation (NVGRE), and Internet Protocol (IP) Generic Routing Encapsulation (GRE), and other encapsulation protocols.

SUMMARY

A common practice for a network element (NE) to transmit overlay traffic to another NE involves first performing a payload destination address lookup to identify a next tunnel endpoint as the receiving NE. The payload destination address lookup consumes a large amount of processing and memory resources and creates an unnecessary amount of overlay traffic transmission delay time. Disclosed herein are various embodiments for forwarding packets via overlay tunnels without having to perform a payload destination address lookup. In an embodiment, an NE sends tunnel advertisement messages including tunnel identifiers (IDs) to other NEs in the overlay network and other networks. In an embodiment, the NE inserts a tunnel ID of a next tunnel into a header of an encapsulated packet before forwarding the packet.

In an embodiment, the disclosure includes a method for providing communication over an overlay virtual network implemented by a first NE, comprising obtaining a tunnel identifier of an overlay tunnel that communicatively couples a second NE to a third NE on an overlay path toward a destination address, receiving a packet comprising the destination address, adding the tunnel identifier to an encapsulation header of the packet, adding an address of the second NE to an outer header of the packet, and forwarding the packet to the second NE, wherein the packet is forwarded from the second NE to the third NE via the overlay tunnel identified by the tunnel identifier. In some embodiments, the disclosure also includes further comprising obtaining a second NE address as of a second overlay tunnel that communicatively couples the first NE to the second NE on the overlay path to the destination address, wherein the packet is forwarded to the second NE via the second overlay tunnel, and/or wherein obtaining the tunnel identifier comprises receiving a tunnel advertisement message, wherein the tunnel advertisement message comprises the tunnel identifier and an address of the second NE, wherein the tunnel identifier is associated with the tunnel from the second NE to the third NE, and wherein the second NE address couples a second overlay tunnel between the first NE and the second NE, and/or wherein the tunnel identifier of the overlay tunnel is obtained using at least one of a border gateway protocol (BGP) and an enhanced internet control message protocol (ICMP), and/or wherein the tunnel identifier of the overlay tunnel is obtained from a software-defined network controller, and/or further comprising storing the tunnel identifier of the overlay tunnel in a tunnel identifier table in association with the second NE, the third NE, and the destination address on the first NE, and performing a lookup in the tunnel identifier table for the tunnel identifier of the overlay tunnel and an address of the second NE after receiving the packet, wherein the lookup is performed using the destination address.

In an embodiment, the disclosure includes a method for providing communication over a stitching tunnel implemented by a first NE, comprising obtaining a tunnel identifier for an overlay tunnel from the first NE to a second NE toward a destination address and an address for a second NE, receiving a plurality of tunnel packets comprising a tunnel identifier in a packet header of each of the tunnel packets, using the tunnel identifier to search for the address of the second NE and a next tunnel identifier in a tunnel identifier table, modifying an encapsulation of each of the tunnel packets to include the next tunnel identifier and the address for the second NE, and transmitting the tunnel packets as modified to the second NE, wherein the tunnel packets are transmitted from the second NE to the third NE via the overlay tunnel identified by the next tunnel identifier. In some embodiments, the disclosure also includes wherein the first NE is a gateway (GW), and further comprising storing a tunnel identifier table that comprises an entry, wherein the entry includes the tunnel identifier and the next tunnel identifier, wherein the tunnel identifier is compatible with the overlay network that the GW is part of, and wherein the next tunnel identifier is not compatible with the overlay network to which the GW belongs, and/or further comprising storing a tunnel identifier table, wherein the tunnel identifier table comprises an entry, wherein the entry comprises the tunnel identifier, the address of the second NE, and the next tunnel identifier, performing a lookup in the tunnel identifier table to obtain the next tunnel identifier and the address of the second NE after the tunnel packets are received, and/or wherein the packets are a user datagram protocol (UDP) packets, wherein an encapsulation header of the packets comprises a flow entropy field, and wherein the next tunnel identifier is added to the flow entropy field of the encapsulation header of the UDP packet, and/or wherein the packets are a UDP packets, wherein the UDP packets comprise a shim header, and wherein the next tunnel identifier is added to the shim header, and/or wherein the tunnel identifier is generated by the first NE when receiving the second NE address of the overlay tunnel and the next tunnel identifier is obtained using at least one of a BGP and an ICMP, and/or wherein the tunnel identifier, the second NE address, and the next tunnel identifier of the overlay tunnel are obtained from a software-defined network controller, and/or wherein the packet is forwarded to the second NE via the second overlay tunnel, and/or wherein the second NE does not have to perform a payload destination lookup before transmitting the tunnel packets to the third NE.

In an embodiment, the disclosure includes a first NE, comprising a processor configured to obtain a tunnel identifier of an overlay tunnel on an overlay path towards a destination address, obtain an address of a second NE on the overlay path, a memory coupled to the processor and configured to store the destination address, the address of the second NE, and the tunnel identifier in a tunnel identifier table, a transmitter coupled to the processor and configured to transmit a tunnel advertisement message to a third NE comprising the tunnel identifier. In some embodiments, the disclosure also includes wherein the third NE is configured to store the tunnel identifier in association with the overlay tunnel in an entry of a second tunnel identifier table stored in a memory of the third NE, and/or wherein the tunnel identifier identifies a tunnel that communicatively couples the first NE to the second NE, and wherein the transmitter is further configured to transmit the tunnel advertisement message comprising the tunnel identifier to a plurality of NEs across a plurality of networks, wherein the tunnel advertisement message is sent to the NEs using BGP, and/or wherein the tunnel identifier identifies a tunnel that communicatively couples the first NE to the second NE, and wherein the tunnel advertisement message is sent to the third NE using an enhanced ICMP message, and/or wherein the first NE is implemented as a software defined network (SDN) controller, wherein the second NE is implemented as a network virtualization edge (NVE), wherein the first NE implemented as the SDN controller is configured to send a plurality of tunnel advertisement messages to a plurality of NEs implemented as NVEs across a plurality of networks, wherein the tunnel advertisement messages comprise one or more tunnel identifiers identifying overlay tunnels provided across the networks.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
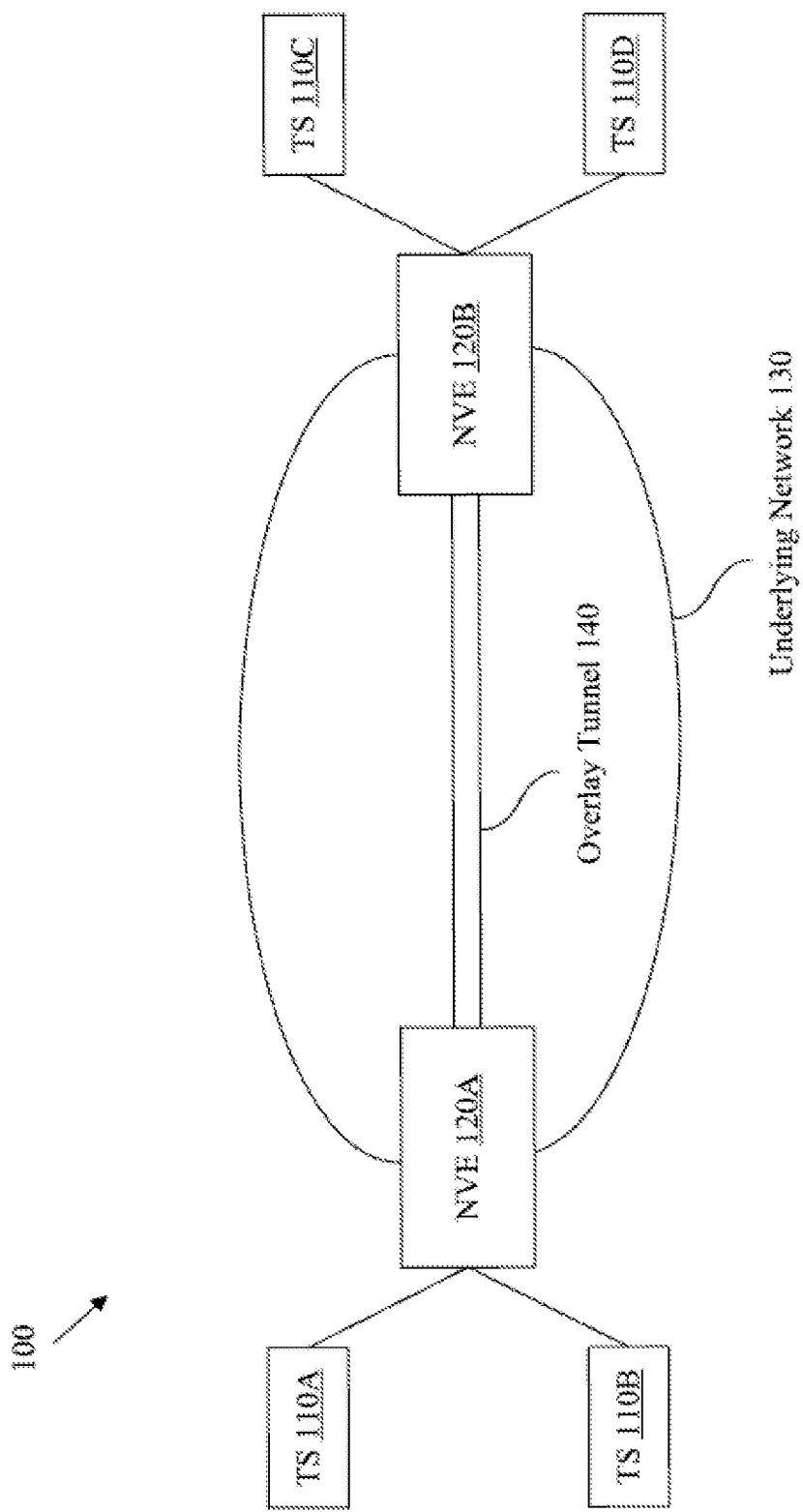
FIG. 1 is a schematic diagram of an example embodiment of an overlay network system where embodiments of the present disclosure may operate.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Tunneling is a mechanism that has been widely used for DCs and wide-area network (WAN) infrastructure Internet Protocol (IP) networks. A method for tunneling may comprise encapsulating original packets using an encapsulation protocol and sending the encapsulated packet from a tunnel ingress to a tunnel egress. The tunnel egress decapsulates the encapsulated packet and forwards the original packet. As a result, tunneled packets are transported as normal IP packets over the delivery network or infrastructure network, where the outer IP source address is a tunnel ingress address and the outer IP destination address is a tunnel egress address. Tunnel mechanisms enable users or third parties to establish a private network over the Internet or without the infrastructure network awareness. Tunnel mechanisms are widely used in cloud computing systems, virtual network applications, software defined networks, and network function virtualizations. A tunnel may carry tenant traffic or private cloud traffic. Virtual networks or clouds may have multipoint topology such that overlay traffic from a tunnel segment may be transported over multiple tunnels.

An important technique in tunnel transport is supporting an underlay transit equal-cost multi-path (ECMP) function. An example of a way to support an underlay transit ECMP function is to generate flow entropy based on payload information and to encode the flow entropy in a field used by a transit network for an ECMP function. A flow entropy is a value that is assigned to a set of packets that belong to a flow or a set of flows. For example, a transit network may hash five tuple for ECMP. UDP source ports are often used for flow entropy in a UDP based encapsulation such as generic routing encapsulation (GRE), virtual extensible local area network (VXLAN), and multiprotocol label switching (MPLS)-in-UDP. Flow entropy generated at tunnel ingress may typically be used only for transiting an ECMP function and may not otherwise be used at a tunnel egress end point.

It should be noted that in the present disclosure, the terms "underlying network," "infrastructure network," and "DC network" all refer to the actual physical network and may be used interchangeably. The terms "overlay virtual network," "tenant network," "overlay instance," "overlay network," and "network virtual overlay instance" refer to network virtualization overlay as described in the Internet Engineering Task Force (IETF) document draft-narten-nvo3-arch-00, published Jul. 8, 2013, which is incorporated herein by reference, and the terms may be used interchangeably. However, a "tenant network" may also comprise one or more overlay networks. The terms "tenant system" (TS) and "endpoint" refer to an entity that originates or receives data from an overlay network, and may be used interchangeably.

FIG. 1 is a schematic diagram of an example embodiment of an overlay network system 100 where embodiments of the present disclosure may operate. Overlay network system 100 may comprise an underlying network 130, a plurality of NVEs 120A-B, an overlay tunnel 140, and a plurality of TSs 110A-D. In an overlay virtual network instance, any pair of NVEs 120A-B may be connected directly by an overlay tunnel 140, which may be a point-to-point (P2P), or point-to-multipoint (P2MP), or multipoint-to-point (MP2P) connection. The overlay tunnel 140 may transport encapsulated data traffic across the underlying network 130 between the pair of NVEs 120A-B. As shown in FIG. 1, NVE 120A may be an ingress tunnel endpoint for overlay tunnel 140, and NVE 120B may be an egress tunnel endpoint for overlay tunnel 140.

FIG. 1 illustrates the NVE 120A residing at the boundary between TS 110A-B and the overlay network, which is formed by the pair of NVEs 120A-B, and the NVE 120B residing at the boundary between TS 110C-D and the overlay network. Each NVE 120 may be associated with a plurality of TSs 110, and may provide network virtualization services to the associated TSs 110. A network virtualization instance may have L2 or L3 functionality as described in the IETF document draft-narten-nvo3-arch-00, published Jul. 8, 2013, where tenant traffic may be tunneled to remote NVEs 120 based on the Media Access Control (MAC) address of the TSs 110 or the IP addresses of the TSs 110, respectively. The data packets may be forwarded between NVEs 120A-B based on the outer addresses on the packets, which may be described in more detail herein below with respect to FIGS. 4-12.

NVEs 120A-B may be implemented using software components, hardware, or a combination of both, and may be located on a virtual switch within a hypervisor, a physical switch, or server. NVEs 120A-B may perform routing, bridging, forwarding functions, and/or overlay virtual network functions. Overlay virtual network functions may include creation and maintenance of overlay network states, data plane encapsulations/decapsulations, overlay tunnel initiations/establishments/tear downs, and automatic selection of overlay tunnels.

TSs 110 may include, but are not limited to VMs on a server, hosts, physical servers or other types of end devices that may originate data to or receive data from the overlay network via an NVE 120A-B. TSs 110 may comprise an L2 Ethernet interface used to communicate with their associated NVEs 120A-B. TSs 110 may be unaware of the overlay network. TSs 110 may communicate to remote TSs 110 in the same tenant network by sending packets directly to their associated NVEs 120A-B.

The underlying network 130 is a physical network that provides connectivity between NVEs 120A-B, but may be completely unaware of the overlay packets, the overlay tunnels 140, and the overlay network. For instance, the underlying network 130 may be a DC physical network comprising Top of Rack (ToR) switches, aggregation switches, core switches, and/or DC gateway routers. Alternatively, the underlying network 130 may be multiple interconnected DC networks where NVEs 120A-B may be located in the same or different DC networks. In addition, the underlying network 130 may support multiple independent overlay networks.

Typically, a large data center may deploy servers with different capacities, and/or features, and servers may be rolled out at different times. For example, a data center may comprise a combination of virtual servers and physical servers, which may be equipped with virtual switches. The servers that are equipped with hypervisor based virtual switches may support different encapsulation protocols, such as VXLAN encapsulation, Microsoft's NVGRE, IP GRE, MPLS or other encapsulation protocols.

The overlay tunnels 140 may transport encapsulated data packets, or encapsulated packets, with a packet header comprising an inner address field, an encapsulation header, and an outer address field. In one embodiment, the inner address field may comprise a media access control (MAC) address of a TS 110C-D that the data packet is destined to and a MAC address of the source TS 110A-D that originated the data packet. The encapsulation header may comprise a virtual network (VN) ID, and/or other encapsulation type specific information.

Figure 2:
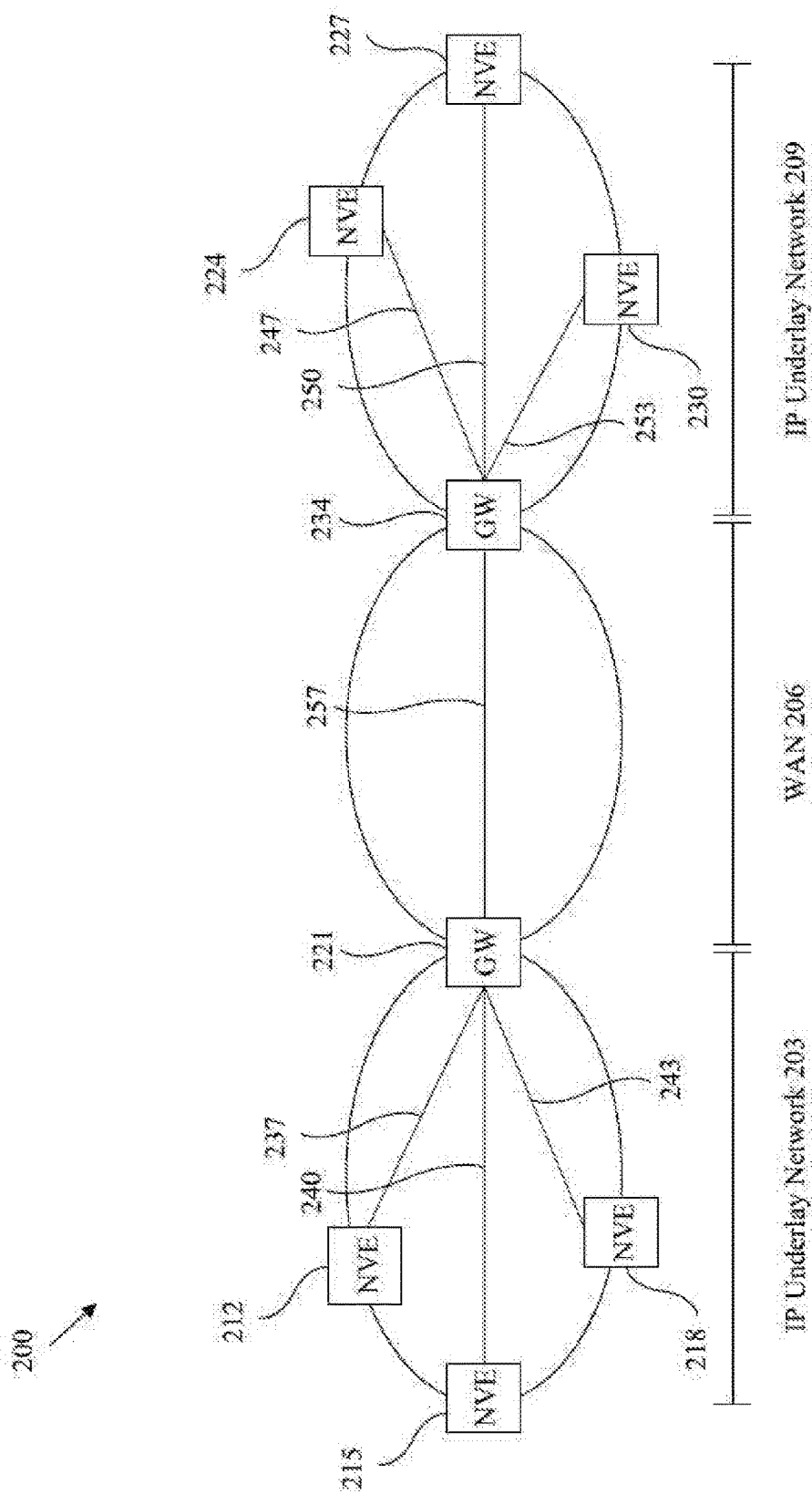
FIG. 2 illustrates an example of an overlay network where embodiments of the present disclosure may operate.

FIG. 2 illustrates an example of an overlay network 200 where embodiments of the present disclosure may operate. As shown in FIG. 2, the overlay network 200 includes a first IP underlay network 203, a wide-area network (WAN) 206, and a second IP underlay network 209. The first IP underlay network 203 comprises NVEs 212, 215, and 218 and GW 221. The second IP underlay network 209 comprises NVEs 224, 227, and 230 and GW 234. The GWs 221 and 234 are communicatively coupled by the WAN 206. The NVEs 212, 215, 218, 224, 227, 230 and GWs 221 and 234 are communicatively coupled together via different overlay tunnels 237, 240, 243, 247, 250, 253, and 257. The NVEs 212, 215, 218, 224, 227, 230 and GWs 221 and 234 may be similar to NVEs 120A-B. The overlay tunnels 237, 240, 243, 247, 250, 253, and 257 may be similar to overlay tunnel 140. In an embodiment, the first IP underlay network 203 may be associated with a first DC, and the second IP underlay network 209 may be associated with a second DC.

The first IP underlay network 203, the WAN 206, and the second IP underlay network 209 may each construct a tunnel connecting NVEs 212, 215, 218, 224, 227, 230 and GWs 221 and 234 to each other such that multiple tunnels chain together to form an end-to-end path that overlay traffic travels through. The first IP underlay network 203 includes an overlay tunnel 237 communicatively coupling NVE 212 and GW 221, an overlay tunnel 240 communicatively coupling NVE 215 and GW 221, and overlay tunnel 243 communicatively coupling NVE 218 and GW 221. For example, when overlay traffic is transmitted from NVE 212 to GW 221, NVE 212 is the ingress for the tunnel 237, and GW 221 is the egress for the tunnel 237. When overlay traffic is transmitted from NVE 215 to GW 221, NVE 215 is the ingress for the tunnel 240, and GW 221 is the egress for the tunnel 240. When overlay traffic is transmitted from NVE 218 to GW 221, NVE 218 is the ingress for the tunnel 243, and GW 221 is the egress for the tunnel 243. When overlay traffic is transmitted from GW 221 to NVEs 212, 215, and 218, GW 221 is the ingress and either NVEs 212, 215, or 218 is the egress.

The second IP underlay network 209 includes an overlay tunnel 247 communicatively coupling NVE 224 and GW 234, an overlay tunnel 250 communicatively coupling NVE 227 and GW 234, and an over tunnel 253 communicatively coupling NVE 230 and GW 234. When overlay traffic is transmitted from NVE 224 to GW 234, NVE 224 is the ingress for the tunnel 247, and GW 234 is the egress for the tunnel 247. When overlay traffic is transmitted from NVE 227 to GW 234, NVE 227 is the ingress for the tunnel 250, and GW 234 is the egress for the tunnel 250. When overlay traffic is transmitted from NVE 230 to GW 234, NVE 230 is the ingress for the tunnel 253, and GW 234 is the egress for the tunnel 253. When overlay traffic is transmitted from GW 234 to NVEs 224, 227, and 230, GW 234 is the ingress and either NVEs 224, 227, and 230 is the egress. Traffic carried by these tunnels forms an overlay network that is decoupled from underlay network traffic.

As shown in FIG. 2, GW 221 and 234 are coupled together via tunnel 257. In an embodiment, tunnel 257 extends between GW 221 and GW 234 to link the first IP underlay network 203 and the second IP underlay network 209 together. An autonomous system boundary router (ASBR) may be used in place of the GW 221 and GW 234. The overlay/underlay network of FIG. 2 may be built over different types of underlay networks. For example, the overlay network 200 may be built over an IP version 4 (IPv4) underlay network, an IP version 6 (IPv6) underlay network, or another suitable underlay network. It should be recognized that the underlay network may include other elements, components, and devices not specifically illustrated in FIG. 2. The overlay network 200 may be arranged in the manner shown in FIG. 2 or in any other suitable manner. An example of tunnels 237, 240, 243, 247, 250, 253, and 257 includes, but is not limited to, a VXLAN tunnel. Although FIG. 2 only shows tunnels from NVEs to GWs, there may also be tunnels interconnecting each of the NVEs in each underlay IP network.

In an embodiment in which overlay traffic traverses from the first IP underlay network 203 to the second IP underlay network 209, GW 221 and 234 serve as the egress for one tunnel and also the ingress for a next tunnel. The two tunnels provide a path for the overlay traffic. Such piggybacking of tunnels are also referred to herein as tunnel stitching. NEs, such as NVEs 212, 215, 218, 224, 227, and 230 or GWs 221 and 234, typically perform a payload destination address lookup in a massive lookup table to determine a next tunnel endpoint, or tunnel egress. The NEs then encapsulate packets again with the next tunnel end point address identified from the payload destination address lookup before forwarding the overlay packet to the next tunnel endpoint identified from the payload destination address lookup. One of the biggest challenges in tunnel stitching methods is that NEs perform the payload destination address lookup in a table with millions of addresses for various NE in overlay and underlay networks.

The embodiments disclosed herein are directed to methods, systems, and apparatuses that perform tunnel stitching while avoiding the payload destination address lookup. The methods, systems, and apparatuses disclosed herein reduce the complexity at a NE to shorten overlay traffic delay time from a source to a destination. For example, overlay tunnels 237, 257, and 247 may be used for overlay traffic from NVE 212 to NVE 224. In such an example, the GW 221 is configured to receive a packet from NVE 212, to decapsulate the packet, to insert (e.g. via encapsulation) information for overlay tunnel 257 and/or overlay tunnel 247 into the decapsulated packet, and to send the packet to the GW 234. GW 234 is configured to decapsulate the packet, to insert information for overlay tunnel 247, and to send the packet to NVE 224. In an embodiment, NVE 224 is configured to decapsulate the packet and to forward the packet to the payload destination.

In one embodiment, NVE 212 receives a tunnel advertisement message from GW 221 including a tunnel ID for tunnel 237, a next tunnel ID for tunnel 257, and/or a next-next tunnel ID for tunnel 247. The tunnel advertisement message indicates IDs of an overlay stitched tunnel for packets having a payload destination address intended for NVE 224 or a TS associated with NVE 224. NVE 212 may store the IDs as entries in a tunnel ID table in a memory of NVE 212.

In one embodiment, NVE 212 may be an ingress node that receives packets with a payload destination address of NVE 224 or a TS associated with NVE 224. NVE 212 is configured to encapsulate these packets by adding an encapsulation header and an outer header to the packets. The encapsulation header includes the ID of the next tunnel and/or the next-next tunnel obtained from the tunnel advertisement message. The outer header includes an address of GW 221. NVE 212 may then forward the encapsulated packets to GW 221 via the tunnel 237.

GW 221 is a tunnel stitching node that receives the encapsulated packets from NVE 212. In one embodiment, GW 221 is configured to decapsulate the encapsulated packets and then obtain the next tunnel ID and/or next-next tunnel ID from the encapsulation header of the packets. For example, GW 221 obtains the next tunnel ID of tunnel 257 from the encapsulation header of the packet. GW 221 may then perform a local lookup at a tunnel ID table stored in a memory of GW 221 to obtain the next tunnel egress address and the next-next tunnel ID. GW 221 replaces the next tunnel ID of tunnel 257 with the next-next tunnel ID of tunnel 247 obtained from the local lookup. GW 221 also replaces the tunnel egress address in the outer header of the encapsulated packet to be the address of GW 234. GW 221 forwards the encapsulated packets to GW 234 via tunnel 257. GW 234 performs similar steps to forward packets to NVE 224, and NVE 224 performs similar steps to forward packets to the TS associated with NVE 224.

ICMP is well supported by IP control protocol. Using ICMP to facilitate overlay traffic transport over a tunnel is simple and aligns well with SDN architectures. A tunnel egress may be configured to use ICMP to redirect overlay traffic to new tunnel egress or to advertise tunnel properties and tunneled traffic properties, which enables ICMP to support overlay, virtualization, and cloud applications. BGP is another control protocol that is often used for BGP next hop to convey tunnel encapsulation information for a prefix. Such protocol can be enhanced to convey tunnel egress assigned flow entropy.

In an embodiment, the tunnel IDs may be inserted into flow entropy fields of an encapsulation header of an encapsulated packet. In an embodiment, a tunnel egress just parses the encapsulation header to determine a next tunnel ID and replaces the flow entropy field value with the next-next tunnel ID. In an embodiment, a tunnel ingress is configured to decapsulate and recapsulate packets such that encapsulation headers of the packets include a next tunnel ID and outer headers of the packets include an address of the tunnel egress.

In an embodiment, a tunnel egress generates a flow entropy and informs the tunnel ingress about the flow entropy value via a control plane protocol. Using a tunnel egress for generating a flow entropy may not require a new protocol, enhancements can be implemented on existing hardware, and implementations works well for SDN architectures and network automation. Generating a flow entropy by tunnel egress empowers use of flow entropy by allowing flow entropy to not only be used to transit ECMP functions but also be used at tunnel egress for next hop transport, which may provide benefits for cloud applications.

Figure 3:
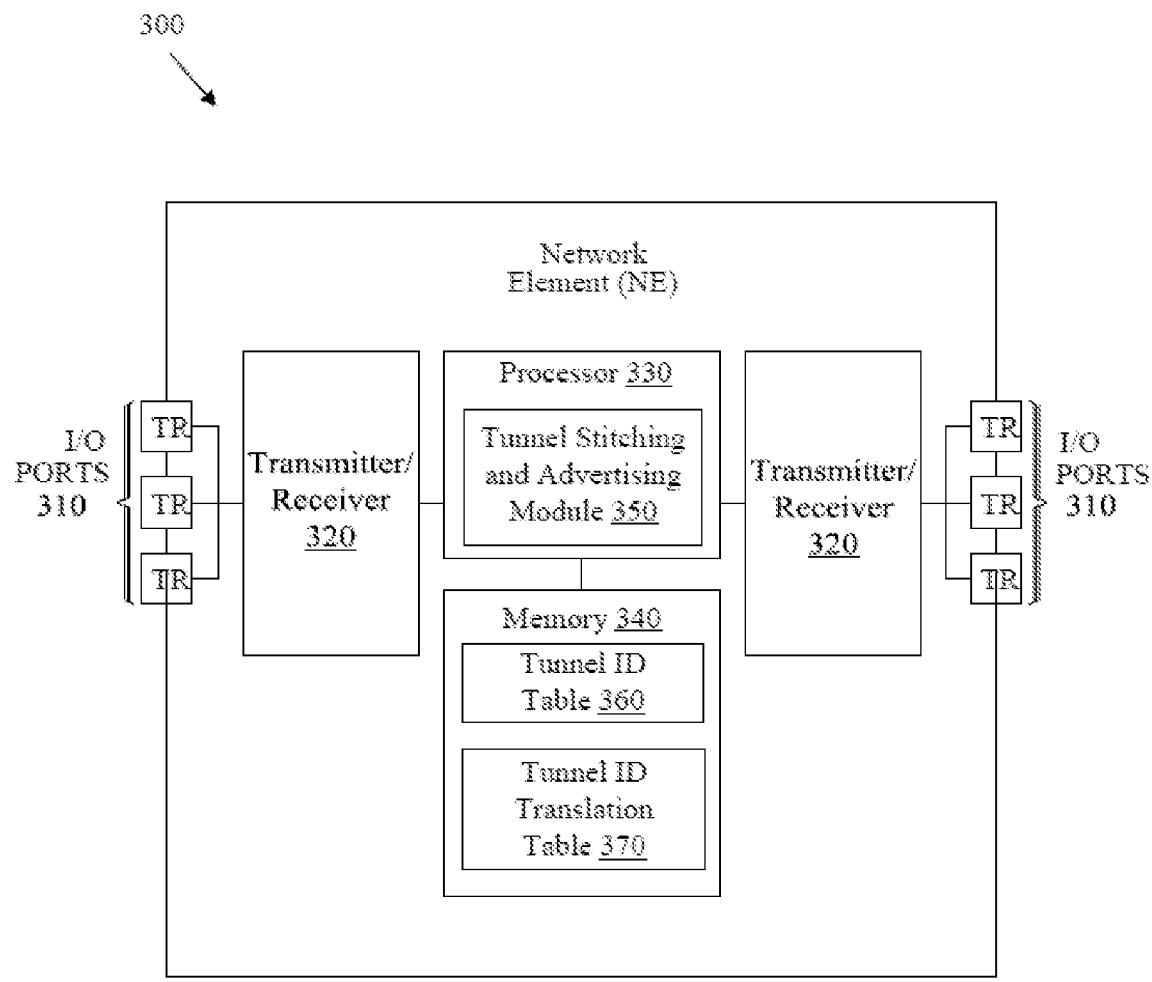
FIG. 3 is a schematic diagram of a NE for implementing the tunnel stitching and tunnel advertising methods disclosed herein.

FIG. 3 is a schematic diagram of a NE 300 for implementing the tunnel stitching and tunnel advertising methods disclosed herein. NE 300 may be suitable for implementing and/or controlling the disclosed embodiments, such as NVEs 120A-B, TS 110A-D, NVEs 212, 215, 218, 224, 227, 230, and/or GWs 221 and 234. NE 300 comprises input/output ports 310, transceiver units (Tx/Rx) 320, a processor 330, and a memory 340. The processor 330 comprising a tunnel stitching and advertising module 350, and the memory 340 comprises a tunnel ID table 360 and a tunnel ID translation table 370. Ports 310 are coupled to Tx/Rx 320, which may be transmitters, receivers, or combinations thereof. The Tx/Rx 320 may transmit and receive data via the ports 310. Processor 330 is configured to process data. Memory 340 is configured to store data and instructions for implementing embodiments described herein. The NE 300 may also comprise electrical-to-optical (EO) components and optical-to-electrical (OE) components coupled to the ports 310 and Tx/Rx 320 for receiving and transmitting electrical signals and optical signals.

The processor 330 may be implemented by hardware and software. The processor 330 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 330 is in communication with the ports 310, Tx/Rx 320, and memory 340.

The processor 330 may be configured to implement the tunnel stitching and advertising module 350 to execute the instructions for implementing various embodiments disclosed herein. In an embodiment, the tunnel stitching and advertising module 350 is implemented as instructions stored in the memory 340. The processor 330 may also implement message sequence diagrams 800 and method 1100 discussed herein. The inclusion of the tunnel stitching and advertising module 350 provides an improvement to the functionality of NE 300. The tunnel stitching and advertising module 350 also effects a transformation of NE 300 to a different state.

The memory 340 comprises one or more of disks, tape drives, or solid-state drives and may be used as an over-flow data storage device, to store programs when such programs are selected for execution, and to store instructions and data that are read during program execution. The memory 340 may be volatile and non-volatile and may be read-only memory (ROM), random-access memory (RAM), ternary content-addressable memory (TCAM), and static random-access memory (SRAM). The memory device 340 may be configured to store tunnel ID table 360 and a tunnel ID translation table 370, as discussed more fully below. NE 300 may include other means for implementing tunnel stitching and advertising module 350, tunnel ID table 360, a tunnel ID translation table 370, and/or method 1100.

It is understood that by programming and/or loading executable instructions onto the NE 300, at least one of the processor 330 and/or memory device 340 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 4:
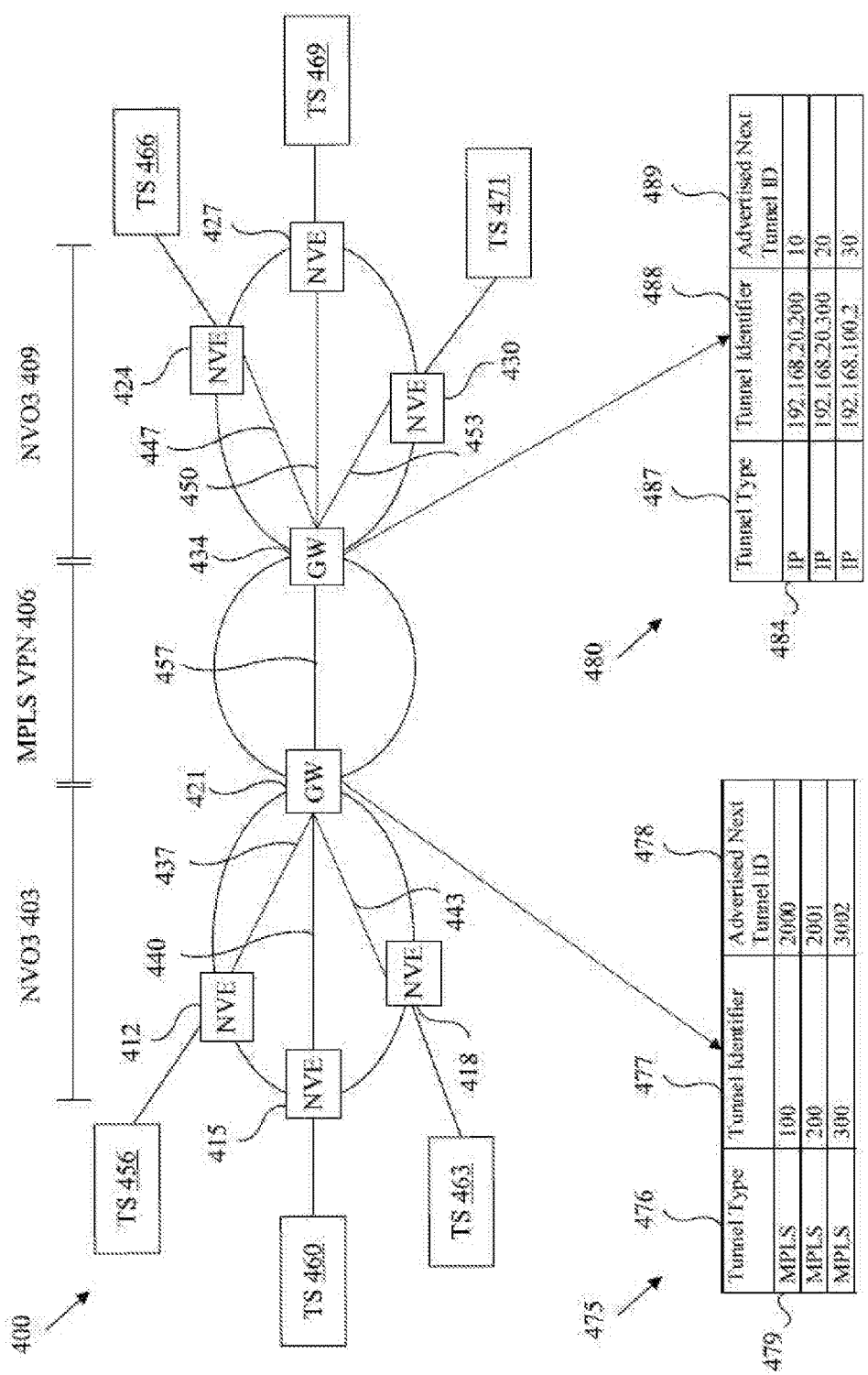
FIG. 4 is a schematic diagram of an overlay network that traverses two different underlying networks that use different overlay traffic encapsulation protocols.

FIG. 4 is a schematic diagram of an overlay network 400 that traverses two different underlying networks that use different overlay traffic encapsulation protocols. As shown in FIG. 4, overlay network 400 includes a first network virtualization overlay network (NVO3) 403, a MPLS virtual private network (VPN) 406, and a second NVO3 409. The first NVO3 403 comprises NVEs 412, 415, and 418 and GW 421. NVE 412 is communicatively coupled to TS 456, NVE 415 is communicatively coupled to TS 460, and NVE 418 is communicatively coupled to TS 463. The MPLS VPN 406 comprises the GW 421 and GW 434, which are coupled together via overlay tunnel 457. The second NVO 409 comprises NVEs 424, 427, and 430 and GW 434. NVE 424 is communicatively coupled to TS 466, NVE 427 is communicatively coupled to TS 469, and NVE 430 is communicatively coupled to TS 471. The NVEs 412, 415, 418, 424, 427, 430 and GWs 421 and 434 are coupled together via different overlay tunnels 437, 440, 443, 447, 450, 453, and 457, as shown in FIG. 4. The NVEs 412, 415, 418, 424, 427, 430 and GWs 421 and 434 may be similar to NVEs 120A-B, NVEs 212, 215, 218, 224, 227, and 230, GWs 221 and 234, and/or NE 300. The overlay tunnels 437, 440, 443, 447, 450, 453, and 457 may be similar to overlay tunnels 237, 240, 243, 247, 250, 253, and 257 and/or overlay tunnel 140. TSs 456, 460, 463, 466, 469, and 471 may be similar to TSs 110A-D.

In an embodiment, NVEs 412, 415, 418, 424, 427, and 430 and GWs 421 and 434 advertise tunnel IDs to other NVEs and GWs across multiple networks using tunnel advertisement messages that conform with BGP. For example, TS 469 is associated NVE 427, and TS 469 may transmit a tunnel advertisement message to NVE 427, which will then relay the tunnel advertisement message to other NVEs and GWs across multiple connecting networks. NVE 427 sends a tunnel advertisement message to GW 434 including an ID of overlay tunnel 450. This tunnel advertisement message informs GW 434 that GW 434 should transmit overlay packets via tunnel 450 to reach the destination of NVE 427 and/or TS 469. GW 434 adds an ID of overlay tunnel 457 to the tunnel advertisement message and relays the tunnel advertisement message to GW 421. The tunnel advertisement message informs GW 421 that any overlay traffic received that is destined for NVE 427 and/or TS 469 should be transmitted through overlay tunnel 457 and overlay tunnel 450. GW 421 may then add an ID of overlay tunnel 437 to the tunnel advertisement message and relay that advertisement message to NVE 412. Similarly, GW 421 may add an ID of overlay tunnel 440 to the tunnel advertisement message and relay that advertisement message to NVE 415. GW 421 may also add an ID of overlay tunnel 443 to the tunnel advertisement message and relay that advertisement message to NVE 418. In this way, NVEs 412, 415, and 418 obtain and store the IDs of tunnels that overlay traffic should be transmitted through to reach the destination NVEs or TSs. Each of the NVEs 412, 415, and 418 may store the tunnel IDs in a next tunnel ID table (e.g., next tunnel ID table 360). NVEs 424, 427, and/or 430, GWs 421 and/or 434, and/or TSs 466, 469, and 471 may send tunnel advertisement messages in a similar fashion.

The first NVO3 403, MPLS VPN 406, and second NVO3 409 use tunnel ID translation tables 475 and 480, respectively, to translate the IDs in the encapsulation headers to ones that are compatible and can be understood by the NVEs and GWs of the respective network. As shown in FIG. 4, tunnel ID translation table 475 includes a column for tunnel types 476, tunnel IDs 477, and advertised next tunnel IDs 478. Tunnel ID translation table 480 includes a column for a tunnel types 487, tunnel IDs 488, and advertised next tunnel IDs 489. In the first NVO3 403, any suitable UDP based encapsulation method may be used such as VXLAN and MPLS-in-UDP. As an example, for traffic from the first NVO3 403 to the second NVO3 409, overlay NVEs 412, 415, and 418 will transmit advertised tunnel IDs 10, 20, and 30, respectively (column 489) for the tunnel IDs 192.168.20.200, 192.168.20.300, and 192.168.100.2 (column 488), respectively. For example, the advertised tunnel IDs in column 489 may be source ports for MPLS-in-UDP encapsulation for destinations TS 456, 460, and 463. GW 421 or GW 434 is configured to terminate the IP tunnel or MPLS encapsulations, to use the advertised tunnel IDs on packets to search for a tunnel ID in column 477 or 488 of table 475 or 480, and to perform MPLS or IP tunnel encapsulation with the tunnel ID in column 477 or 488.

For example, GW 421 may receive an encapsulated UDP packet from NVE 424 and GW 434 comprising the advertised tunnel ID 2000 in the encapsulated packet. For example, the advertised tunnel ID 2000 is in the UDP source port field of the UDP encapsulated packet. GW 421 determines that the first NVO3 403 does not use the same encapsulation protocol as the second NVO3 409. Therefore, GW 421 translates the advertised tunnel ID in the encapsulated packets into a compatible tunnel ID according to columns 476, 477, and 478 of table 475. For example, GW 421 translates the advertised tunnel ID from 2000 (row 479, column 478) to the tunnel ID 100 (row 479, column 477) for an MPLS tunnel type (row 479, column 476) according to row 479 of table 475.

Similarly, GW 434 may receive encapsulated packets from NVE 412 and GW 421 comprising the advertised tunnel ID 100 in the encapsulated packets. For example, the advertised tunnel ID 100 is in the BGP label of the encapsulated packets. GW 434 determines that second NVO3 409 does not use the same encapsulation protocol as the first NVO3 403 or the MPLS VPN 406. Therefore, GW 434 translates the advertised tunnel ID in the encapsulated packets into a compatible tunnel ID according to columns 487, 488, and 489 of table 480. For example, GW 434 translates the advertised tunnel ID from 100 (row 484, column 489) to the tunnel ID 192.168.20.200 (row 484, column 488) for an IP tunnel type (row 484, column 487) according to row 484 of table 480.

In an embodiment, the IDs in the tunnel translation tables 475 and 480 may be values advertised by NVEs 412, 415, 418, 424, 427, and/or 430, GWs 421 and/or 434, and/or TSs 456, 460, 463, 466, 469, and/or 471 as tunnel advertisement messages by signaling protocols. Examples of signaling protocols for informing tunnel ingresses include, but are not limited to, BGP, label distribution protocol (LDP), resource reservation protocol (RSVP)-traffic engineering (TE), and ICMP. In an embodiment, the IDs in the tunnel translation tables 475 and 480 may be values that are included in a flow entropy field of a UDP encapsulation header of a UDP packet. Examples of flow entropy fields include, but are not limited to, UDP source ports, MPLS entropy labels, and IP version 6 (IPv6) flow labels. Any suitable tunnel encapsulation may be employed to support the flow entropy field, for example, VXLAN, GUE, locator ID separation protocol (LISP), and MPLS. In an embodiment, a type-length-value (TLV) may be used to encode flow entropy value in a signaling protocol.

In an embodiment, BGP may be employed to relay tunnel advertising messages across multiple networks. For example, a new flag and flow entropy value field may be used in an Encapsulation TLV or sub-TLV for VXLAN, VXLAN-generic protocol extension (GPE), or Network Virtualization over Generic Routing Encapsulation (NVGRE). Additional information for the Encapsulation sub-TLV is described in Internet Engineering Task Force (IEFT) draft, draft-ietf-idr-tunnel-encaps-00, entitled, "Using the BGP Tunnel Encapsulation Attribute without the BGP Encapsulation SAFI," by E. Rosen, et al., published on Aug. 6, 2015, which is hereby incorporated by reference in its entirety. In an embodiment, a 20-bit flow entropy field contains a flow entropy value when the flag is set and the 20-bit flow entropy field is set to zero when the flag is clear. The first 16-bit filed may be used for the flow entropy value if a UDP source port is the entropy field in the UDP encapsulated header of the UDP packet.

A new tunnel encapsulation sub-TLV may be implemented for a BGP speaker to signal the flow entropy that associates to the tunnel encapsulation indicated by tunnel Encapsulation TLV. The tunnel encapsulation sub-TLV may be configured to indicate a first type that indicates the tunnel encapsulation sub-TLV is a next tunnel egress assigned flow entropy (NTE-FL) or a second type that indicates the tunnel encapsulation sub-TLV is a last tunnel egress assigned flow entropy (LTE-FL). In an embodiment, the tunnel encapsulation sub-TLV is configured with a length of eight octets and a 32-bit value field. Alternatively, any suitable length and bit field size may be employed as would be appreciated by one of ordinary skill upon viewing this disclosure. The first 16-bit field may be used for the flow entropy value if a UDP source port is the entropy field in the UDP encapsulation header of the UDP packet. The first 20-bit field may be used for the flow entropy value if an MPLS entropy label is used or if an IPv6 flow label is used.

Figure 5:
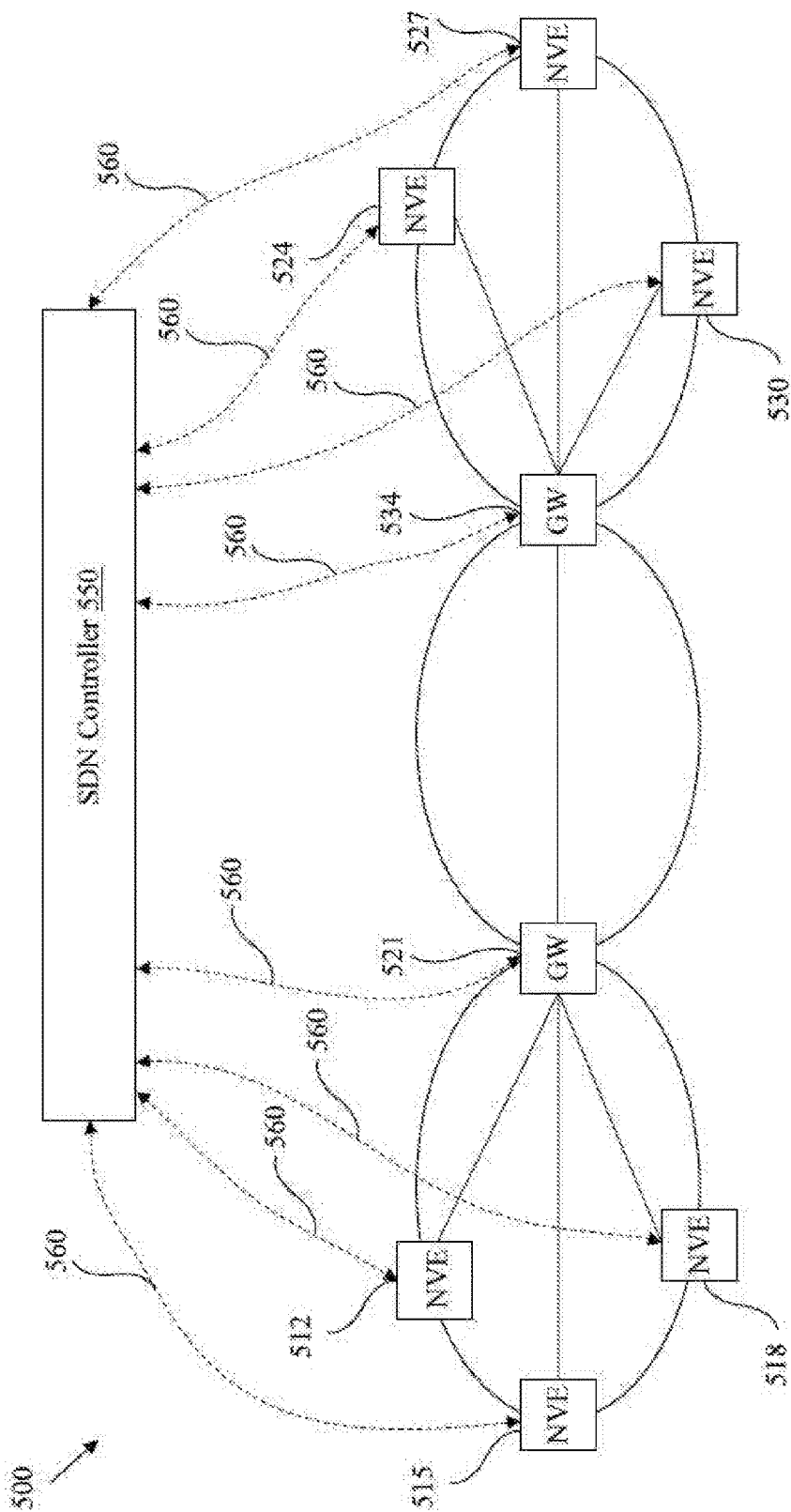
FIG. 5 illustrates an example of a SDN overlay network (SDON).

FIG. 5 illustrates an example of a SDON 500. The SDON 500 comprises NVEs 512, 515, 518, 524, 527, and 530, GWs 521 and 534, and a SDN controller 550. NVEs 512, 515, 518, 524, 527, and 530 and GWs 521 and 534 may be similar to NVEs 120A-B, NVEs 212, 215, 218, 224, 227, 230 and GWs 221 and 234, and/or NE 300. The SDN controller 550 is communicatively coupled to NVEs 512, 515, 518, 524, 527, and 530 and GWs 521 and 534. The SDN controller 550 provides a solution for creating overlay tunnels between the NVEs and the GWs in the SDON 500. SDN is a networking architecture that decouples the control plane from the data plane. That decoupling allows for centralization of network control, enabling effective policy administration and flexible management. The centralization of network control facilitates various network functionalities such as network measurements, traffic engineering, enhanced quality of services, and enhanced access control. In addition, new services may be easily added to SDN-based networks. Thus, service providers may benefit from the SDN architecture.

The SDN controller 550 may be a virtual machine (VM), a hypervisor, or any other device configured to manage and control the SDON 500. The SDN controller 550 obtains and/or maintains a full topology view of the SDON 500. The SDN controller 550 computes forwarding overlay tunnels through the SDN overlay network according to the topology information. For example, the SDN controller 550 may employ a shortest path algorithm to determine a tunnel path between a source-destination pair in the SDON. After computing the tunnel paths, the SDN controller 550 sends forwarding instructions to the NVEs 512, 515, 518, 524, 527, and 530 and GWs 521 and 534 to instruct the NVEs and GWs to encapsulate and/or insert addresses into headers of the packets according to the computed forwarding paths. The SDN controller 550 communicates with all NVEs 512, 515, 518, 524, 527, and 530 and GWs 521 and 534 via a plurality of communication channels 560. The communication channels 560 are also referred to as controller-network communication channels.

The NVEs 512, 515, 518, 524, 527, and 530 and GWs 521 and 534 are software programmable network devices configured to perform forwarding functions in the SDON 500 according to forwarding instructions received from the SDN controller 550 via the communication channels 560. In an embodiment, the SDN controller 550 comprises a memory that stores a tunnel ID table (e.g., tunnel ID table 360) and a tunnel ID translation table (e.g., tunnel ID translation table 370). The SDN controller 550 may receive a tunnel advertisement message from each of NVEs 512, 515, 518, 524, 527, and 530 and GWs 521 and 534 indicating tunnel IDs for the tunnels which NVEs 512, 515, 518, 524, 527, and 530 and GWs 521 and 534 are ingress or egress nodes of. SDN controller 550 may also receive network mappings from each of the NVEs 512, 515, 518, 524, 527, and 530 and GWs 521 and 534 via communication channels 560. The network mappings may include a tunnel ID, a tunnel end point address, a next tunnel ID, and/or a next-next tunnel ID. The SDN controller 550 stores these network mappings in the tunnel ID table. The SDN controller 550 may also use the tunnel IDs to generate the tunnel ID translation table when IDs for the same NVE, GW, or TS across different networks are different. For example, in the situation where GWs connect two different types of networks, different IDs will be used to identify different NVEs and GWs. The SDN controller 550 may generate the tunnel translation table so that the GWs can properly translate the tunnel IDs into IDs that are understandable by each of the NVEs and GWs in the network.

In one embodiment, the SDN controller 550 communicates next tunnel IDs with each of NVEs 512, 515, 518, 524, 527, and 530 and GWs 521 and 534 so that each of NVEs 512, 515, 518, 524, 527, and 530 and GWs 521 and 534 can insert next tunnel IDs into headers of encapsulated packets. For example, the SDN controller 550 transmits a message to each of NVEs 512, 515, 518, 524, 527, and 530 and GWs 521 and 534 including information about overlay and tunnel endpoint mapping such that each of NVEs 512, 515, 518, 524, 527, and 530 and GWs 521 and 534 can use the information to insert next tunnel IDs into overlay packets. In an embodiment, NVEs 512, 515, 518, 524, 527, and 530 and/or GWs 521 and 534 perform packet encapsulation, encode a next tunnel ID in an encapsulation header of the packet, and encode a tunnel endpoint ID in the outer header of the packet before forwarding the packet. In an embodiment, GWs 521 and 534 decapsulate packets and use next tunnel IDs and data received from the SDN controller 550 to identify tunnel endpoints. GWs 521 and 534 may be configured to replace the outer header of the packet to include an address of a tunnel egress and insert or replace a tunnel ID in the flow entropy field of an encapsulation header with a next tunnel ID. In an embodiment, GWs 521 and 534 may be configured to translate addresses in the outer header and/or encapsulation header of the packets according to tunnel ID translation tables (e.g., tunnel ID translation table 370) stored at the SDN controller 550 or received from the SDN controller 550.

In one embodiment, the SDN controller 550 may transmit the next tunnel ID table to each of NVEs 512, 515, 518, 524, 527, and 530 and GWs 521 and 534 so that the NVEs and the GWs do not have to receive the next tunnel ID from the SDN controller each time an overlay packet is received. In this way, the SDN controller 550 generates the next tunnel ID table and forwards the table to each of NVEs 512, 515, 518, 524, 527, and 530 and GWs 521 and 534 so that the of NVEs 512, 515, 518, 524, 527, and 530 and GWs 521 and 534 do not have to advertise tunnel IDs with each other.

Figure 6:
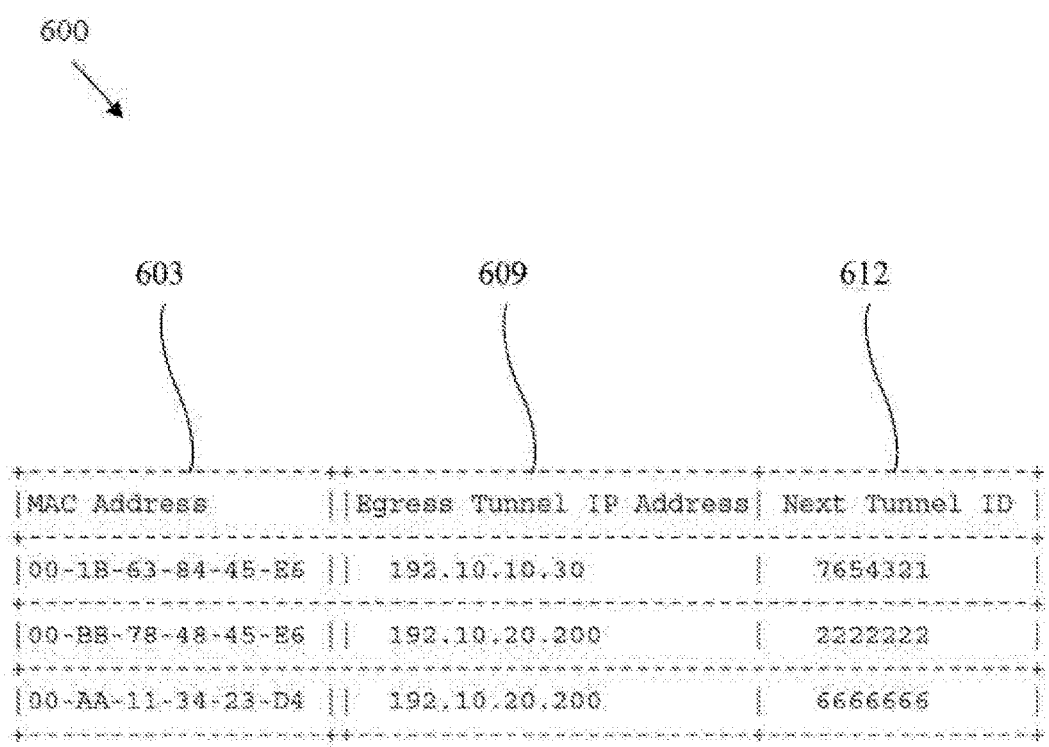
FIG. 6 is an example of the tunnel ID table.

FIG. 6 is an example of the tunnel ID table 600. In an embodiment, the tunnel ID table 600 is an example of the tunnel ID table 360 stored in memory 340. An SDN controller (e.g., SDN controller 550) is configured to push mappings to NVEs and GWs in the SDON (e.g., SDON 500) such that the NVEs and GWs generate the tunnel ID table 600. In an embodiment, the NVEs and GWs are similar to NVEs 512, 515, 518, 524, 527, and/or 530, GWs 521 and/or 534, and/or NE 300. The tunnel ID table 600 shown in FIG. 6 comprises a column for a MAC addresses 603, a column for egress tunnel IP addresses 609, and a column for next tunnel IDs 612. As can be appreciated, the tunnel ID table 600 may comprise any additional information related to the tunnels and the NVEs for a software defined overlay network.

In an embodiment, an SDN controller in SDON pushes mappings to an NVE or GW that is a tunnel ingress. The mappings may include a MAC address of tunnel ingress, a tunnel end point address, and a next tunnel ID. The MAC address may be a MAC address of the NVE or GW. The tunnel end point address may be an IP address of a tunnel endpoint. The next tunnel ID may be an IP address of the next tunnel for the tunnel ingress. The NVE or GW may create an entry in the tunnel ID table 600 and store the MAC address in the column for MAC addresses 603, the tunnel end point address in the column for egress tunnel IP addresses 609, and the next tunnel ID in the column for next tunnel ID 612. The tunnel ingress may be configured to identify packets that include the tunnel end point address the payload or prefix of the packet, and encapsulate the packet by adding an encapsulation header and an outer header. The tunnel ingress inserts the next tunnel ID in the encapsulation header, inserts the tunnel egress address in the outer header of the packet, and forwards the packets to the next NVE or GW.

Figure 7:
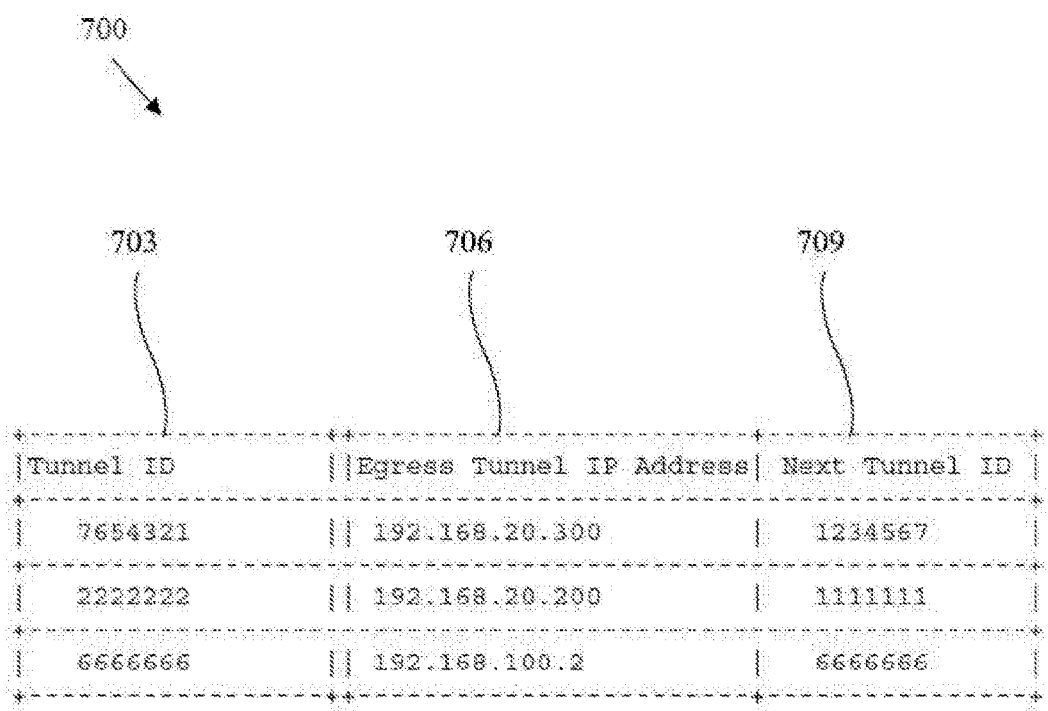
FIG. 7 is an example of the tunnel ID table.

FIG. 7 is an example of the tunnel ID table 700. In an embodiment, the tunnel ID table 700 is similar to the tunnel ID table 600, except that tunnel ID table 700 includes a column for tunnel IDs 703 instead of a column for MAC addresses 603. An SDN controller (e.g., SDN controller 550) is configured to push mappings to NVEs and GWs in a SDON (e.g., SDON 500) such that the NVEs and GWs generate the tunnel ID table 700. In an embodiment, the NVEs and GWs are similar to NVEs 512, 515, 518, 524, 527, and/or 530, GWs 521 and/or 534, and/or NE 300. The tunnel ID table 700 shown in FIG. 7 comprises a column for tunnel IDs 703, a column for egress tunnel IP addresses 706, and a column for next tunnel IDs 709. As shown be appreciated, the tunnel ID table 700 may comprise any additional information related to the tunnels and the NVEs for a software defined overlay network.

In an embodiment, an SDN controller in a SDON pushes mappings to an NVE or GW that is a tunnel ingress. The mappings may include a tunnel ID of the current tunnel that the tunnel ingress receiving the mapping is the tunnel ingress of, a tunnel end point address, and a next tunnel ID of the next tunnel that packets intended for the tunnel end point address should be transmitted through. The tunnel ID may be an IP address of the current tunnel that the NVE or GW receiving the mapping is the tunnel ingress of. The tunnel end point address may be an IP address of a tunnel endpoint. The next tunnel ID may be an IP address of the next tunnel that packets including a certain destination address should be transmitted through. The tunnel ingress may create an entry in the tunnel ID table 700 and store the tunnel ID in the column for tunnel IDs 703, the tunnel end point address in the column for egress tunnel IP addresses 706, and the next tunnel ID in the column for next tunnel ID 709. The tunnel ingress may be configured to identify packets that include the tunnel end point address in the outer header, replace the next-next tunnel ID in the encapsulation header with the tunnel ID, insert the next tunnel egress address in the outer header of the packet, and forward the packet to the next NVE or GW.

Figure 8:
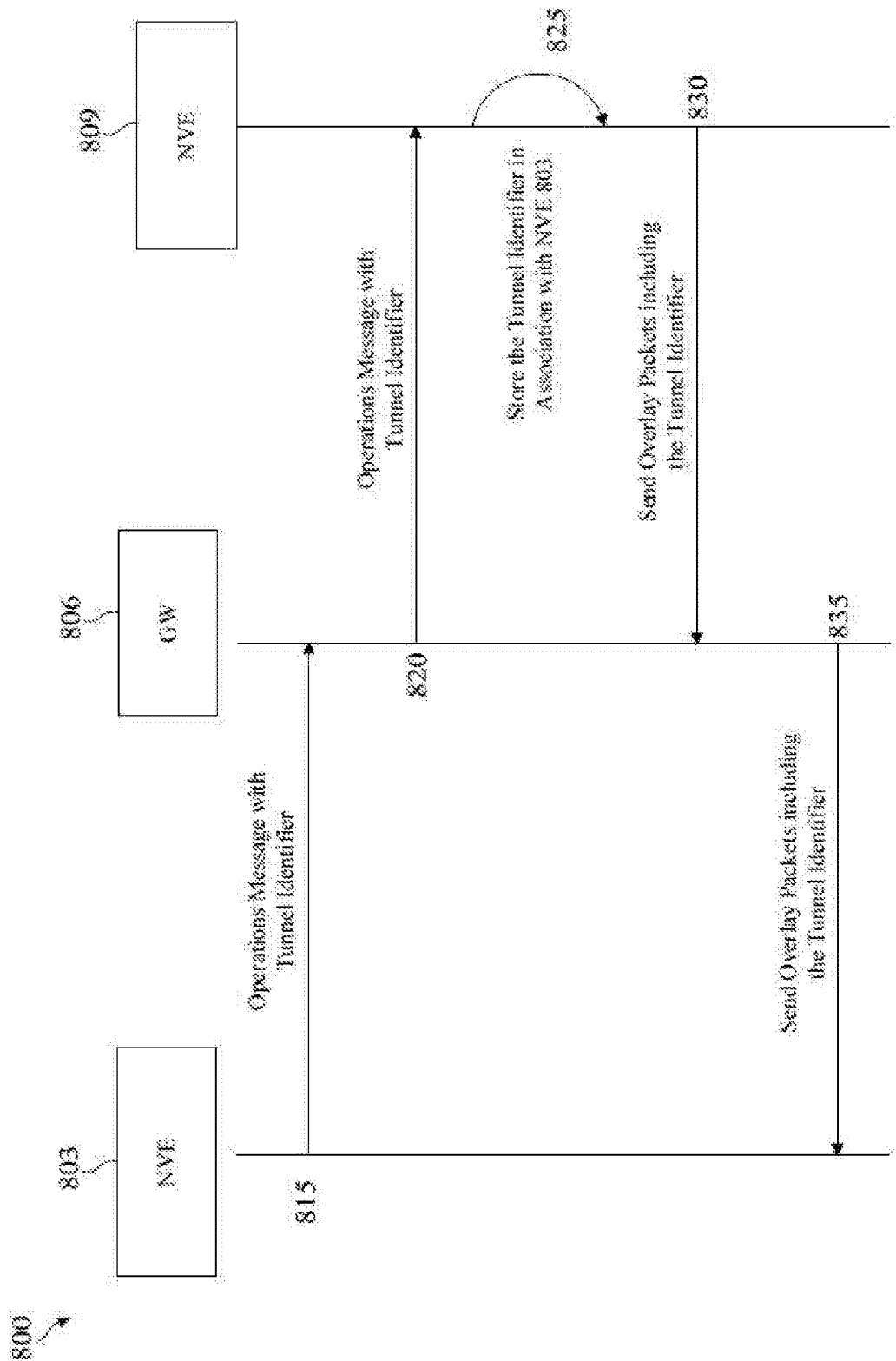
FIG. 8 is a message sequence diagram illustrating an example of how ICMP operations messages are used to advertise tunnel IDs to NVEs and GWs across multiple overlay networks.

FIG. 8 is a message sequence diagram 800 illustrating an example of how ICMP operations messages are used to advertise tunnel IDs to NVEs and GWs across multiple overlay networks. The steps shown in diagram 800 are implemented when NVE 803 initiates advertisement of tunnel IDs of tunnels that NVE 803 is coupled to. Diagram 800 includes NVEs 803 and 809 and GW 806. In an embodiment, NVEs 803 and 809 and GW 806 are similar to NVEs 120A-B, NVEs 212, 215, 218, 224, 227, 230 and GWs 221 and 234, and/or NE 300. For example, the tunnel stitching and advertising module 350 executed by each of NVEs 803 and 809 and GW 806 may implement some or all of the steps in diagram 800.

At step 815, NVE 803 sends an operations message with a tunnel ID of a tunnel connecting NVE 803 and GW 806. In an embodiment, the operations message may be in accordance with the enhanced ICMP operations message disclosed in U.S. patent application Ser. No. 15/208,347, filed on Jul. 12, 2016, which is hereby incorporated by reference in its entirety. In an embodiment, the enhanced ICMP operations message is a tunnel advertising message including IDs of tunnels that NVE 803 is either an ingress or an egress of. In an embodiment, NVE 803 may be associated with a TS (e.g., TS 110). In such an embodiment, NVE 803 may send the operations message including an ID of a tunnel that packets should be transmitted through to reach the destination of the TS associated with the NVE 803.

GW 806 receives the operations message with the tunnel ID of a tunnel connecting GW 806 and NVE 803. GW 806 may identify multiple NVEs and GWs of the same network or different networks to forward the operations message to, one of which is NVE 809. GW 806 adds an ID of a tunnel connecting GW 806 and NVE 809 to the operations message received from NVE 803. At step 820, GW 806 forwards the operations message with both tunnel IDs to NVE 809.

NVE 809 receives the operations message with the tunnel ID of a tunnel connecting NVE 803 and GW 806 and the tunnel ID connecting GW 806 and NVE 809. At step 825, NVE 809 stores the tunnel IDs in association with the NVEs and GWs that are the ingress and/or egress of the tunnels identified by the tunnel IDs. For example, NVE 809 may comprise a memory (e.g., memory 340) that stores a tunnel ID table (e.g., tunnel ID table 360). NVE 809 may add a first entry to the tunnel ID table for the tunnel ID connecting NVE 803 and GW 806 and a second entry to the tunnel ID table for the tunnel ID connecting GW 806 and NVE 809.

NVE 809 may later receive packets intended to be transmitted to the TS associated with NVE 803. NVE 809 may perform a lookup in the tunnel ID table for the next tunnel to use in transmitting packets to the TS associated with NVE 803. In this way, NVE 809 may identify the entry in the tunnel ID table that indicates the tunnel ID connecting GW 806 and NVE 803. NVE 809 may insert the tunnel ID into a flow entropy field of an encapsulation header of the overlay packet. At step 830, NVE 809 forwards the packets including the tunnel ID via a tunnel to GW 806.

GW 806 may also store a tunnel ID table in a memory of GW 806. GW 806 may perform a lookup in the tunnel ID table to determine an ID of a tunnel or path that connects NVE 803 with the TS associated with NVE 803. GW 806 may insert that ID into a flow entropy field of an encapsulation header of the overlay packets intended for NVE 803. At step 835, GW 806 may forward the packets to NVE 803 via a tunnel.

Figure 9:
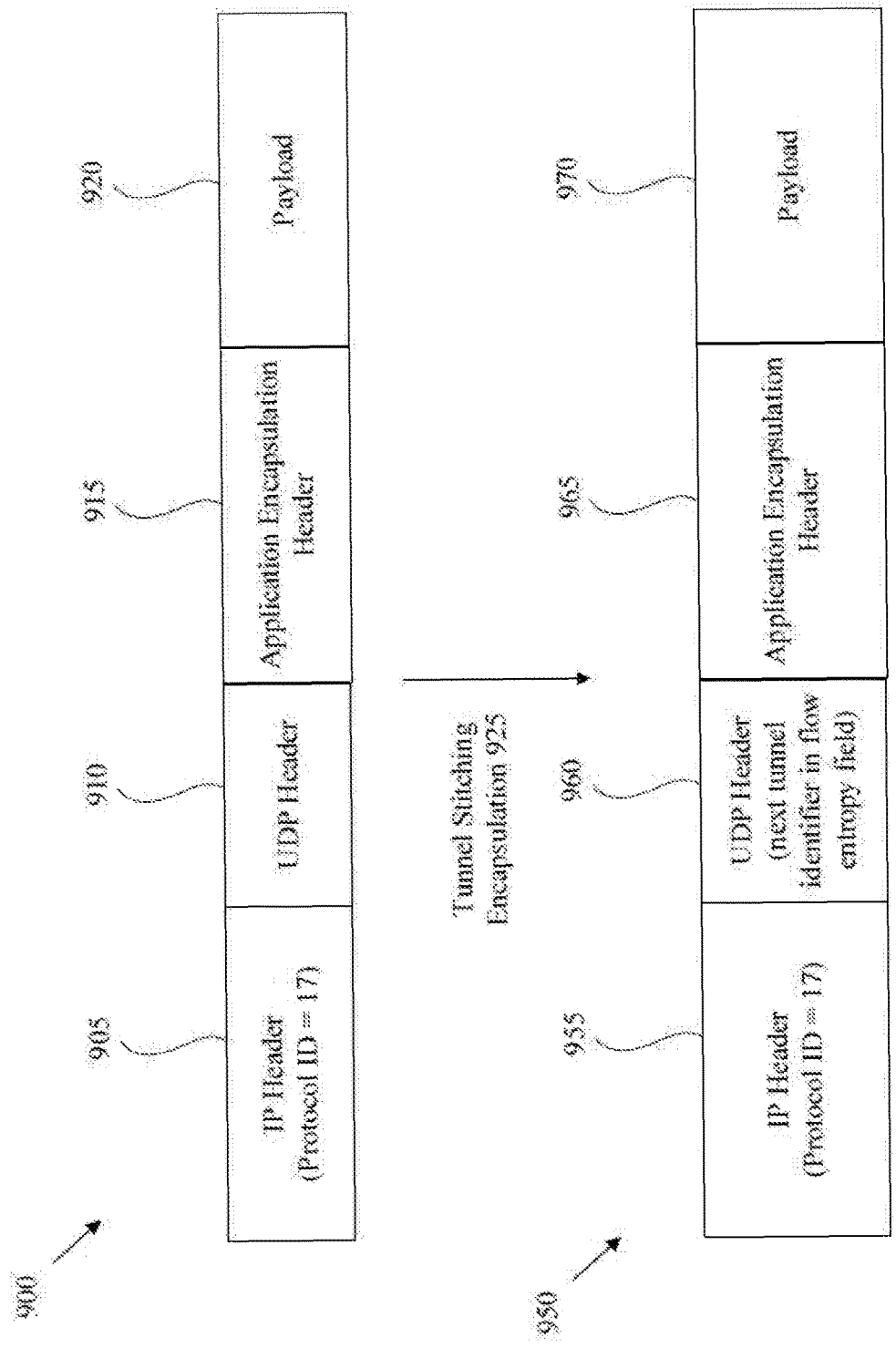
FIG. 9 illustrates an example of UDP packets that are transmitted by NVEs.

FIG. 9 illustrates an example of UDP packets 900 and 950 that are transmitted by NVEs 120A-B, NVEs 212, 215, 218, 224, 227, and/or 230, GWs 221 and/or 234, and/or NE 300. In an embodiment, UDP packets 900 and 950 may be in accordance with the ITEF document, version 13, entitled "GRE-in-UDP Encapsulation," Jul. 4, 2016, which is hereby incorporated by reference in its entirety. As shown, the UDP packet 900 includes an IP header 905, a UDP header 910, an application encapsulation header 915, and a payload 920. The IP header 905 contains a protocol number. In UDP packet 900, the protocol number is 17, which signifies that the packet is a UDP packet and includes a UDP header.

The UDP header 910 contains, among other things, a destination port number (not shown). The destination port number identifies the transportation protocol used to transport the packet. Such transportation protocols include, but are not limited to, Locator/ID Separation Protocol (LISP), Virtual Extensible Local Area Network (VXLAN), Multi-protocol Label Switching (MPLS)-in-UDP, VXLAN-Generic Protocol Extension (GPE), and Service Function Chaining (SFC). LISP is described in the Internet Engineering Task Force (IETF) document Request for Comments (RFC) 6830 entitled "The Locator/ID Separation Protocol (LISP)," January 2013, which is incorporated by reference in its entirety. VLXAN is described in the IETF document RFC 7348 entitled "Virtual eXtensible Local Area Network (VXLAN): A Framework for Overlaying Virtualized Layer 2 Networks over Layer 3 Networks," August 2014, which is incorporated by reference in its entirety. MPLS-in-UDP is described in RFC 7510 entitled "Encapsulating MPLS in UDP," April 2015, which is incorporated by reference in its entirety. VXLAN-GPE is described in IETF document version 2 entitled "Generic Protocol Extension for VXLAN," Apr. 21, 2016, which is incorporated by reference in its entirety. SFC is described in IETF document version 2 entitled "UDP Transport for Network Service Header," Feb. 11, 2016, which is incorporated by reference in its entirety.

The payload 920 in packet 900 represents the original packet and may include content or information that is to be transmitted through the overlay network. The payload may be, for example, an original Media Access Control (MAC) packet or another type of packet.

In an embodiment, an NVE or a GW is configured to perform tunnel stitching and encapsulation 925 on the UDP packet 900 to generate UDP packet 950. The UDP packet 950 also includes an IP header 955, a UDP header 960, an application encapsulation header 965, and a payload 970. IP header 955 is similar to IP header 905, application encapsulation header 965 is similar to application encapsulation header 915, and payload 970 is similar to payload 920. However, UDP header 960 further includes a next tunnel ID in a field of the UDP header. In an embodiment, the next tunnel ID may be included in a flow entropy field of a UDP encapsulation header.

In an embodiment, a tunnel ingress identifies a field in a UDP header of a UDP packet, such as a flow entropy field, encodes an ID of a next tunnel or a next-next tunnel in that field of the encapsulation header of the UDP packet, and transmits the UDP packet to a tunnel egress via an overlay network. The tunnel egress uses the ID in the field of the UDP header to identify the next tunnel by which to forward the UDP packet through without having to perform a payload destination address lookup using the IP address of the final destination of the UDP packet.

Figure 10:
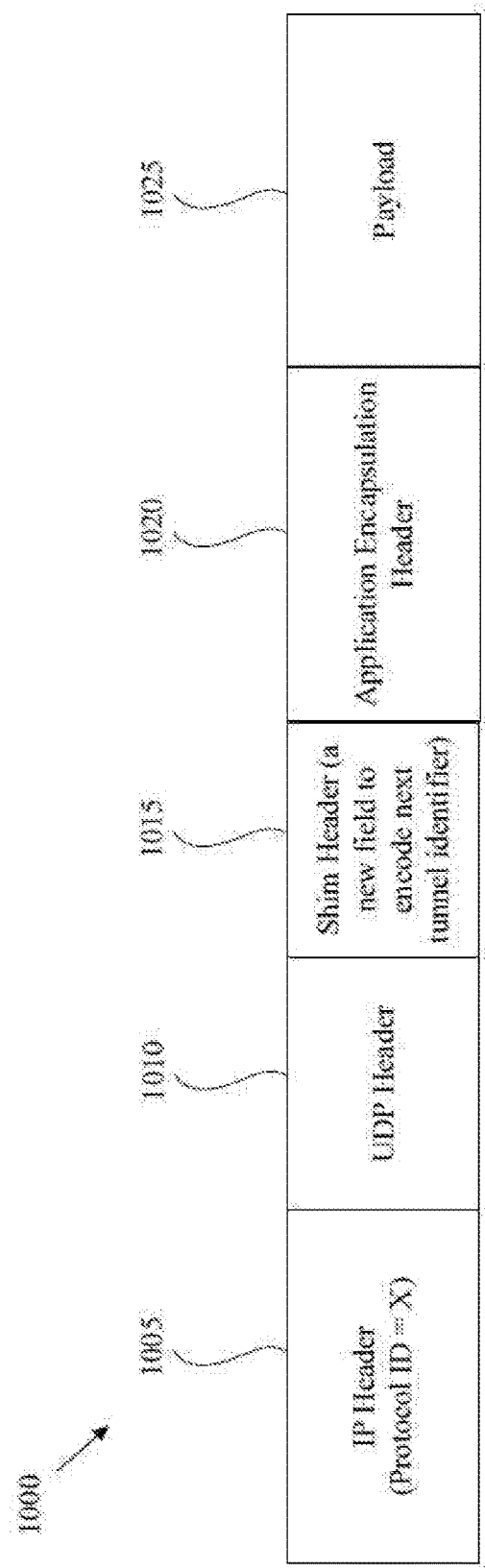
FIG. 10 illustrates an example of UDP packet that is transmitted by NVEs.

FIG. 10 illustrates an example of UDP packet 1000 that may be transmitted by NVEs 120A-B, NVEs 212, 215, 218, 224, 227, and/or 230, GWs 221 and/or 234, and/or NE 300. The UDP packet 1000 is similar to the UDP packets 900 and 950. However, unlike the UDP packets 900 and 950, the UDP packet 1000 includes an indicator signifying that the packets contain a shim header following the UDP header. As shown in FIG. 10, the UDP packet 1000 includes an IP header 1005, a UDP header 1010, a shim header 1015, an application encapsulation header 1020, and a payload 1025. In the UDP packet 1000, the indicator signifying that the tunnel packets contain a shim header 1015 following the UDP header 1010 is the protocol number X contained in the IP header 1005, where X represents an integer other than the number 17. The protocol number X signifies a UDP tunnel application and indicates that the UDP packet 1000 contains a shim header 1015 following the UDP header 1010.

The shim header 1015 is a few bytes placed between the UDP header and the payload. The bytes carry information agreed upon by the source and destination to be used for a specific purpose. In an embodiment, the shim header 1015 identifies or contains a transport feature. In an embodiment, the transport feature is one or more of fragmentation, checksum, remote offload, and so on. The transportation feature may be, for example, one or more of the transportation features described in IETF document version 0 entitled "Generic UDP Encapsulation," Jun. 10, 2016, which is incorporated herein by reference. In an embodiment, the shim header in the tunnel packet contains all or part of the Generic UDP Encapsulation (GUE) header in the IETF document version 0 entitled "Generic UDP Encapsulation." In an embodiment, the protocol field in the GUE header is set to 59 to indicate that GUE is being used.

In an embodiment, the shim header 1015 includes several fields for UDP transport including, but not limited to, a length field, flag fields, optional fields, a private data field, and so on. In an embodiment, the shim header includes an operation, administration and management (OAM) flag, a control flag, and the next tunnel ID. In an embodiment, the shim header may also include a next-next tunnel ID.

Figure 11:
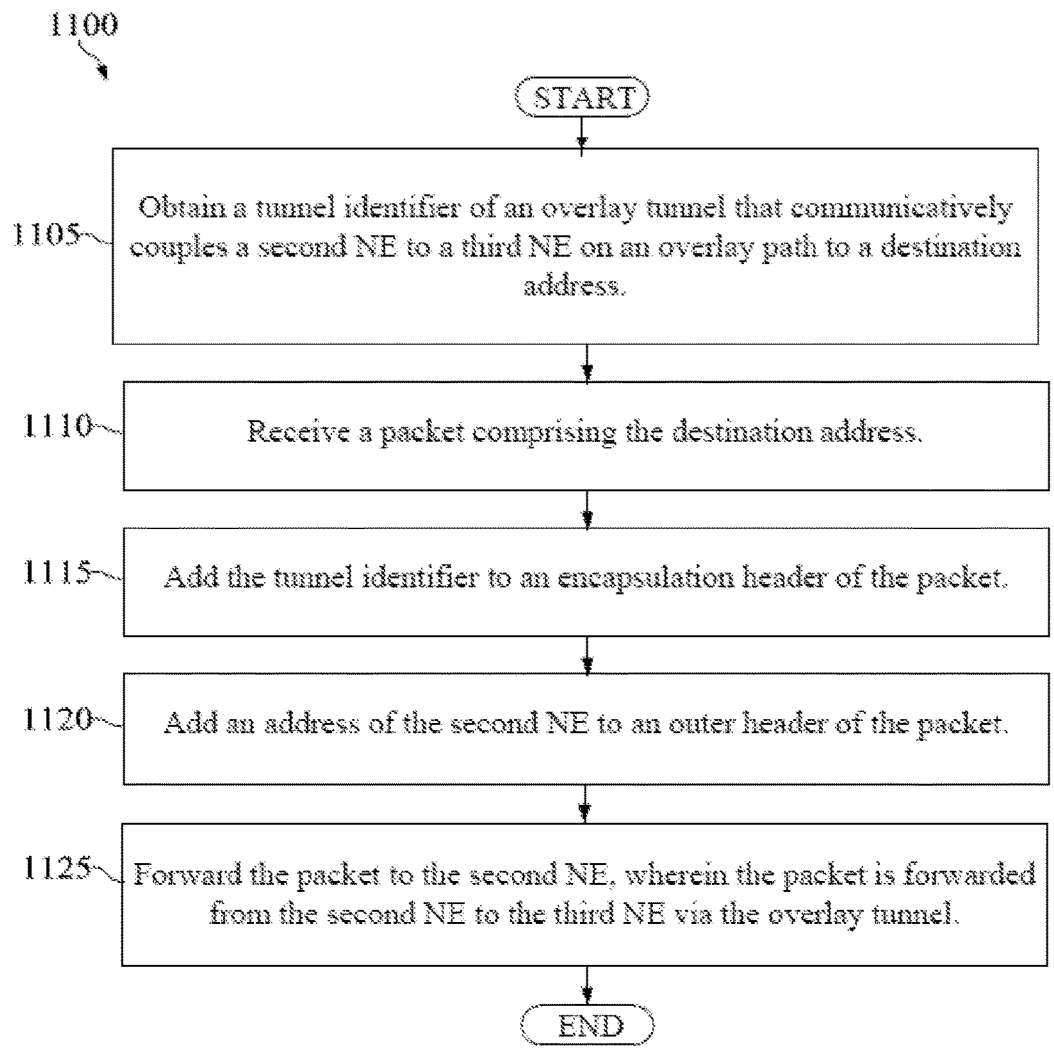
FIG. 11 illustrates a flowchart of an example embodiment of a method 1100 implementing a tunnel stitching method.

FIG. 11 illustrates a flowchart of an example embodiment of a method 1100 implementing a tunnel stitching method. Method 1100 may be implemented by a first NE, such as NVEs 120A-B, NVEs 212, 215, 218, 224, 227, and/or 230, GWs 221 and/or 234, and/or NE 300. Method 1100 may begin when tunnel IDs have been advertised to the NE. At step 1105, a tunnel ID of an overlay tunnel that communicatively couples a second NE to a third NE on an overlay path to a destination address is obtained. For example, processor 330 obtains the tunnel ID of the overlay tunnel that communicatively couples a second NE to a third NE on an overlay path to a destination address is obtained. In an embodiment, obtaining the tunnel ID comprises receiving a tunnel advertisement message from the second NE. The tunnel advertisement message comprises the tunnel ID and a second tunnel ID. The second tunnel ID identifies a second overlay tunnel that communicatively couples the first NE and the second NE. In an embodiment, the tunnel ID is obtained using at least one of a BGP and an enhanced ICMP. In an embodiment, the tunnel ID is obtained from the SDN controller (e.g., SDN controller 550).

At step 1110, a packet comprising the destination address is received. For example, Tx/Rx 320 receives the packet comprising the destination address. In an embodiment, the ID of the overlay tunnel may be stored in a tunnel ID table in association with the second NE, the third NE, and the destination address. A lookup may be performed in the tunnel ID table for the ID of the overlay tunnel after receiving the packet. In an embodiment, the lookup is performed using the destination address.

At step 1115, the tunnel ID is added to an encapsulation header of the packet. For example, processor 330 adds the tunnel ID to the encapsulation header of the packet. In an embodiment, the packet is a UDP packet, and the encapsulation header of the UDP packet comprises a flow entropy field. The tunnel ID is added to the flow entropy field of the encapsulation header of the UDP packet. In an embodiment, the UDP packet comprises a shim header, and the tunnel identifier is added to the shim header. In an embodiment, the processor 330 is configured to replace a previous tunnel ID in the encapsulation header of the packet with the tunnel ID.

At step 1120, an address of the second NE is added to an outer header of the packet. In an embodiment, the processor 330 adds an address of the second NE to an outer header of the packet. In an embodiment, an address of the first NE is also added to the outer header of the packet. In an embodiment, the processor 330 is configured to replace an address of the first NE in the outer header of the packet with the address of the second NE. The address of the first NE and the address of the second NE may be IP addresses or MAC addresses.

At step 1125, the packet is forwarded to the second NE. For example, the Tx/Rx 320 forwards the packet to the second NE. In an embodiment, the packet is forwarded from the second NE to the third NE via the overlay tunnel. In an embodiment, the NE obtains a second tunnel ID of a second overlay tunnel that communicatively couples the first NE to the second NE on the overlay path to the destination address such that the packet is forwarded to the second NE via the second overlay tunnel.

In an embodiment, the disclosure includes a means for obtaining a tunnel identifier of an overlay tunnel that communicatively couples a second NE to a third NE on an overlay path toward a destination address, a means for receiving a packet comprising the destination address, a means for adding the tunnel identifier to an encapsulation header of the packet, a means for adding an address of the second NE to an outer header of the packet, and a means for forwarding the packet to the second NE, wherein the packet is forwarded from the second NE to the third NE via the overlay tunnel identified by the tunnel identifier.

In an embodiment, the disclosure includes a means for obtaining a tunnel identifier for an overlay tunnel from the first NE to a second NE toward a destination address and an address for a second NE, a means for receiving a plurality of tunnel packets comprising a tunnel identifier in a packet header of each of the tunnel packets, a means for using the tunnel identifier to search for the address of the second NE and a next tunnel identifier in a tunnel identifier table, a means for modifying an encapsulation of each of the tunnel packets to include the next tunnel identifier and the address for the second NE, and a means for transmitting the tunnel packets as modified to the second NE, wherein the tunnel packets are transmitted from the second NE to the third NE via the overlay tunnel identified by the next tunnel identifier.

In an embodiment, the disclosure includes a means for obtaining a tunnel identifier of an overlay tunnel on an overlay path towards a destination address, a means for obtaining an address of a second NE on the overlay path, a means for storing the destination address, the address of the second NE, and the tunnel identifier in a tunnel identifier table, and a means for transmitting a tunnel advertisement message to a third NE comprising the tunnel identifier.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for providing communication over an overlay virtual network implemented by a first network element (NE), comprising:
    obtaining a tunnel identifier of an overlay tunnel that communicatively couples a second NE to a third NE on an overlay path toward a destination address;
    receiving a packet comprising the destination address;
    encapsulating the packet to include an encapsulation header, wherein the encapsulation header comprises the tunnel identifier that identifies the overlay tunnel that communicatively couples the second NE to the third NE on the overlay path toward the destination address;
    encapsulating the packet to include an outer header, wherein the outer header comprises an address of the second NE; and
    forwarding the packet to the second NE, wherein the packet is forwarded from the second NE to the third NE via the overlay tunnel identified by the tunnel identifier.

2. The method of claim 1, further comprising obtaining a second NE address as of a second overlay tunnel that communicatively couples the first NE to the second NE on the overlay path to the destination address, wherein the packet is forwarded to the second NE via the second overlay tunnel.

3. The method of claim 1, wherein obtaining the tunnel identifier comprises receiving a tunnel advertisement message, wherein the tunnel advertisement message comprises the tunnel identifier and an address of the second NE, wherein the tunnel identifier is associated with the tunnel from the second NE to the third NE, and wherein the second NE address couples a second overlay tunnel between the first NE and the second NE.

4. The method of claim 1, wherein the tunnel identifier of the overlay tunnel is obtained using at least one of a border gateway protocol (BGP) and an enhanced internet control message protocol (ICMP).

5. The method of claim 1, wherein the tunnel identifier of the overlay tunnel is obtained from a software-defined network controller.

6. The method of claim 1, further comprising:
    storing the tunnel identifier of the overlay tunnel in a tunnel identifier table in association with the second NE, the third NE, and the destination address on the first NE; and
    performing a lookup in the tunnel identifier table for the tunnel identifier of the overlay tunnel and an address of the second NE after receiving the packet, wherein the lookup is performed using the destination address.

7. A method for providing communication over a stitching tunnel implemented by a first network element (NE), comprising:
    obtaining a tunnel identifier for an overlay tunnel from the first NE to a second NE toward a destination address and an address for a second NE, wherein the tunnel identifier identifies the overlay tunnel from the first NE to the second NE toward the destination address;

receiving a plurality of tunnel packets comprising the tunnel identifier in a packet header of each of the tunnel packets;

obtaining the address of the second NE and a next tunnel identifier in a tunnel identifier table based on the tunnel identifier, wherein the next tunnel identifier identifies a next overlay tunnel from the second NE to a third NE toward the destination address;

modifying an encapsulation of each of the tunnel packets to include the next tunnel identifier and the address for the second NE; and transmitting the tunnel packets as modified to the second NE, wherein the tunnel packets are transmitted from the second NE to the third NE via the overlay tunnel identified by the next tunnel identifier.

8. The method of claim 7, wherein the first NE is a gateway (GW), and further comprising storing a tunnel identifier table that comprises an entry, wherein the entry includes the tunnel identifier and the next tunnel identifier, wherein the tunnel identifier is compatible with the overlay network that the GW is part of, and wherein the next tunnel identifier is not compatible with the overlay network to which the GW belongs.

9. The method of claim 7, further comprising:

storing a tunnel identifier table, wherein the tunnel identifier table comprises an entry, wherein the entry comprises the tunnel identifier, the address of the second NE, and the next tunnel identifier; and performing a lookup in the tunnel identifier table to obtain the next tunnel identifier and the address of the second NE after the tunnel packets are received.

10. The method of claim 7, wherein the packets are a user datagram protocol (UDP) packets, wherein an encapsulation header of the packets comprises a flow entropy field, and wherein the next tunnel identifier is added to the flow entropy field of the encapsulation header of the UDP packet.

11. The method of claim 7, wherein the packets are a user datagram protocol (UDP) packets, wherein the UDP packets comprise a shim header, and wherein the next tunnel identifier is added to the shim header.

12. The method of claim 7, wherein the tunnel identifier is generated by the first NE when receiving the second NE address of the overlay tunnel and the next tunnel identifier is obtained using at least one of a border gateway protocol (BGP) and an enhanced internet control message protocol (ICMP).

13. The method of claim 7, wherein the tunnel identifier, the second NE address, and the next tunnel identifier of the overlay tunnel are obtained from a software-defined network controller.

14. The method of claim 7, wherein the packet is forwarded to the second NE via the second overlay tunnel.

15. The method of claim 7, wherein the second NE does not have to perform a payload destination lookup before transmitting the tunnel packets to the third NE.

16. A first network element (NE), comprising:

a processor configured to:
 obtain a tunnel identifier of an overlay tunnel on an overlay path towards a destination address, wherein the tunnel identifier identifies the overlay tunnel on the overlay path towards the destination address; and
 obtain an address of a second NE on the overlay path;

a memory coupled to the processor and configured to store the destination address and the address of the second NE in association with the tunnel identifier in a tunnel identifier table; and a transmitter coupled to the processor and configured to transmit a tunnel advertisement message comprising the tunnel identifier to a third NE.

17. The first NE of claim 16, wherein the third NE is configured to store the tunnel identifier in association with the overlay tunnel in an entry of a second tunnel identifier table stored in a memory of the third NE.

18. The first NE of claim 16, wherein the tunnel identifier identifies a tunnel that communicatively couples the first NE to the second NE, and wherein the transmitter is further configured to transmit the tunnel advertisement message comprising the tunnel identifier to a plurality of NEs across a plurality of networks, wherein the tunnel advertisement message is sent to the NEs using border gateway protocol (BGP).

19. The first NE of claim 16, wherein the tunnel identifier identifies a tunnel that communicatively couples the first NE to the second NE, and wherein the tunnel advertisement message is sent to the third NE using an enhanced internet control message protocol (ICMP) message.

20. The first NE of claim 16, wherein the first NE is implemented as a software defined network (SDN) controller, wherein the second NE is implemented as a NVE, wherein the first NE implemented as the SDN controller is configured to send a plurality of tunnel advertisement messages to a plurality of NEs implemented as NVEs across a plurality of networks, wherein the tunnel advertisement messages comprise one or more tunnel identifiers identifying overlay tunnels provided across the networks.

* * * * *